Aug. 22, 1933.  W. H. MASON  1,923,548
ARTICLE HANDLING SYSTEM
Original Filed Nov. 30, 1926   7 Sheets-Sheet 1
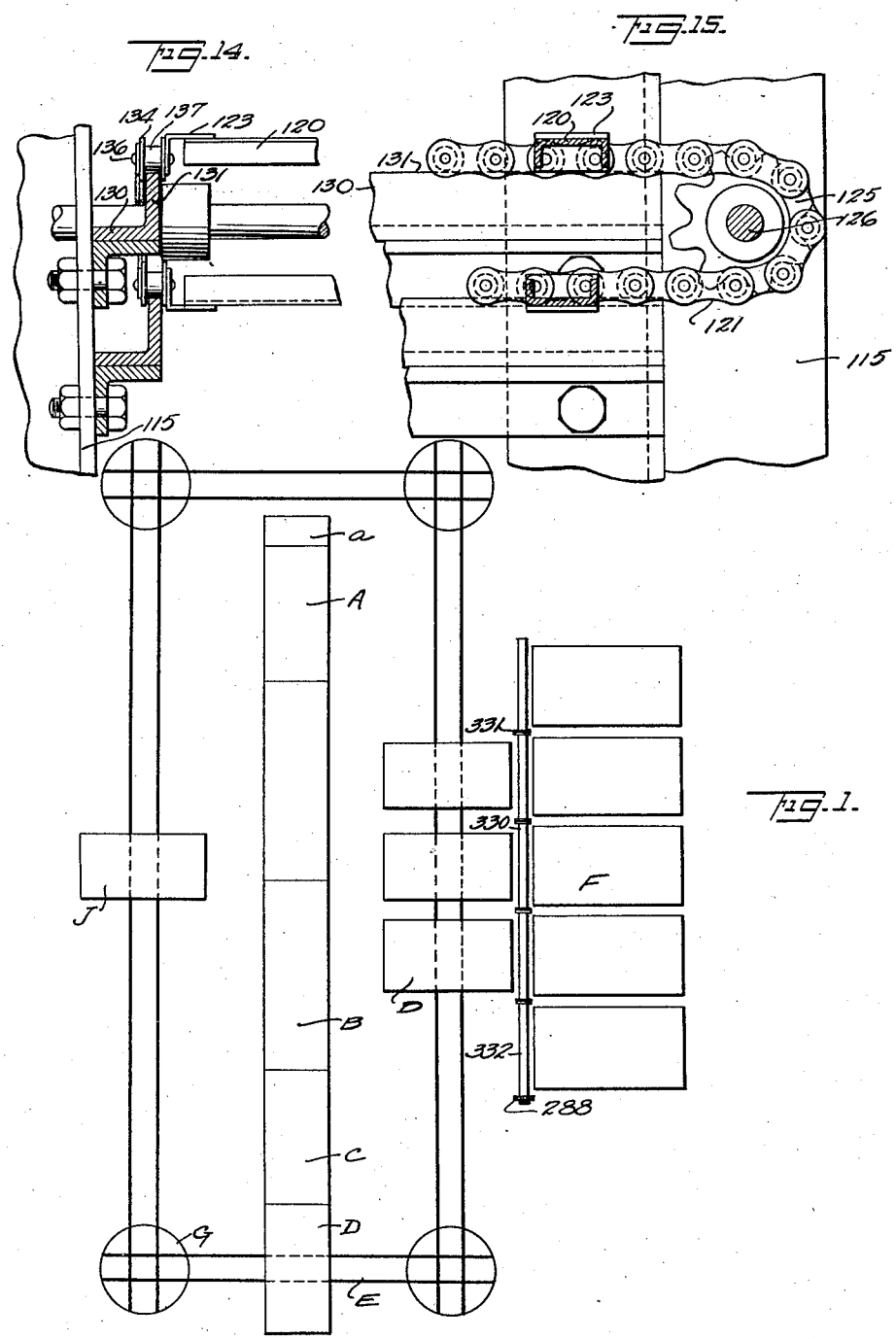
INVENTOR
William H. Mason
BY
Dyke, Holden & Schaines
ATTORNEYS Aug. 22, 1933.   W. H. MASON   1,923,548
ARTICLE HANDLING SYSTEM
Original Filed Nov. 30, 1926   7 Sheets-Sheet 2
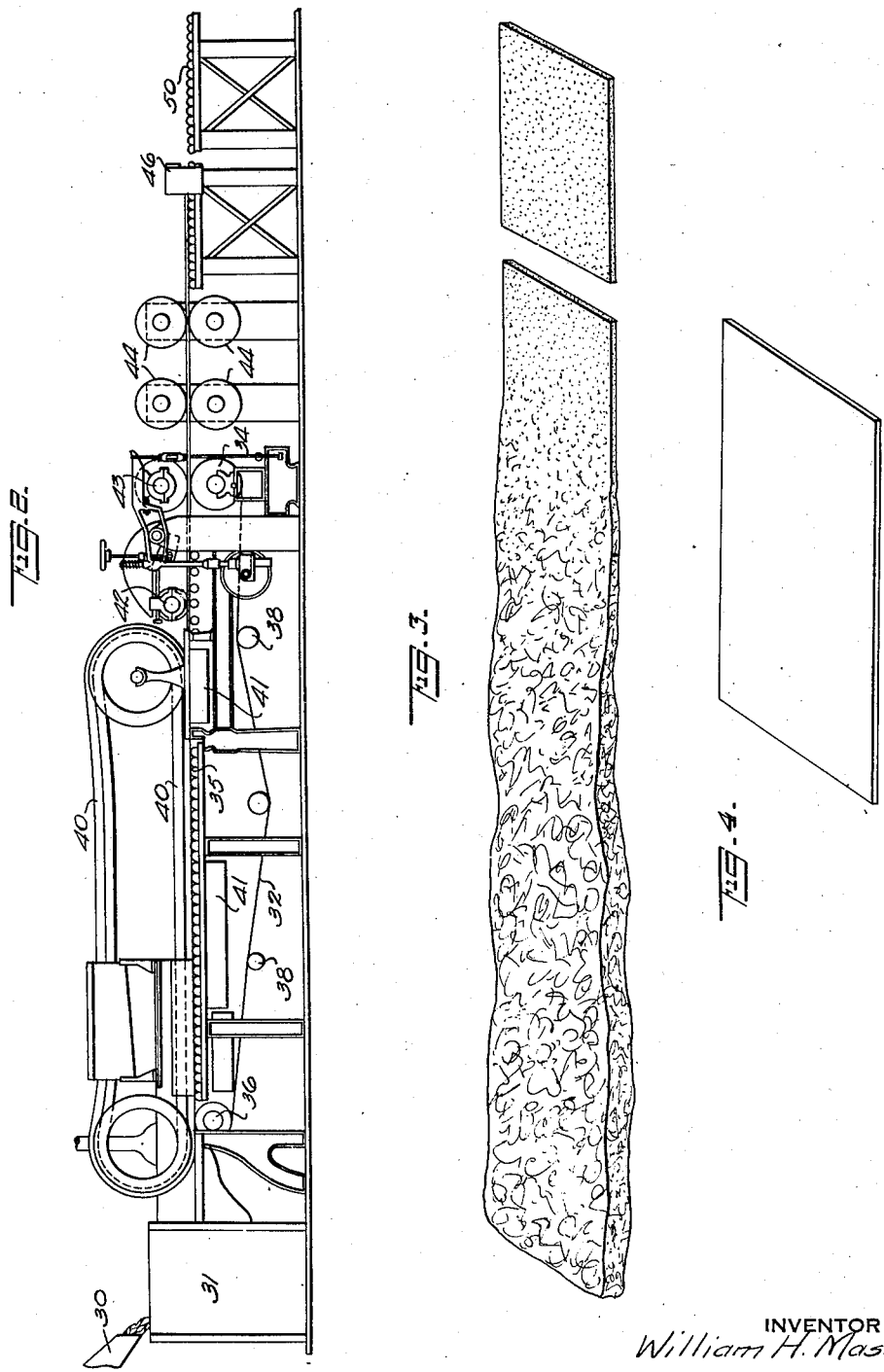
INVENTOR
William H. Mason
BY
Dyke, Holden & Schaines
ATTORNEYS Aug. 22, 1933.　　　　W. H. MASON　　　　1,923,548
ARTICLE HANDLING SYSTEM
Original Filed Nov. 30, 1926　　7 Sheets-Sheet 3
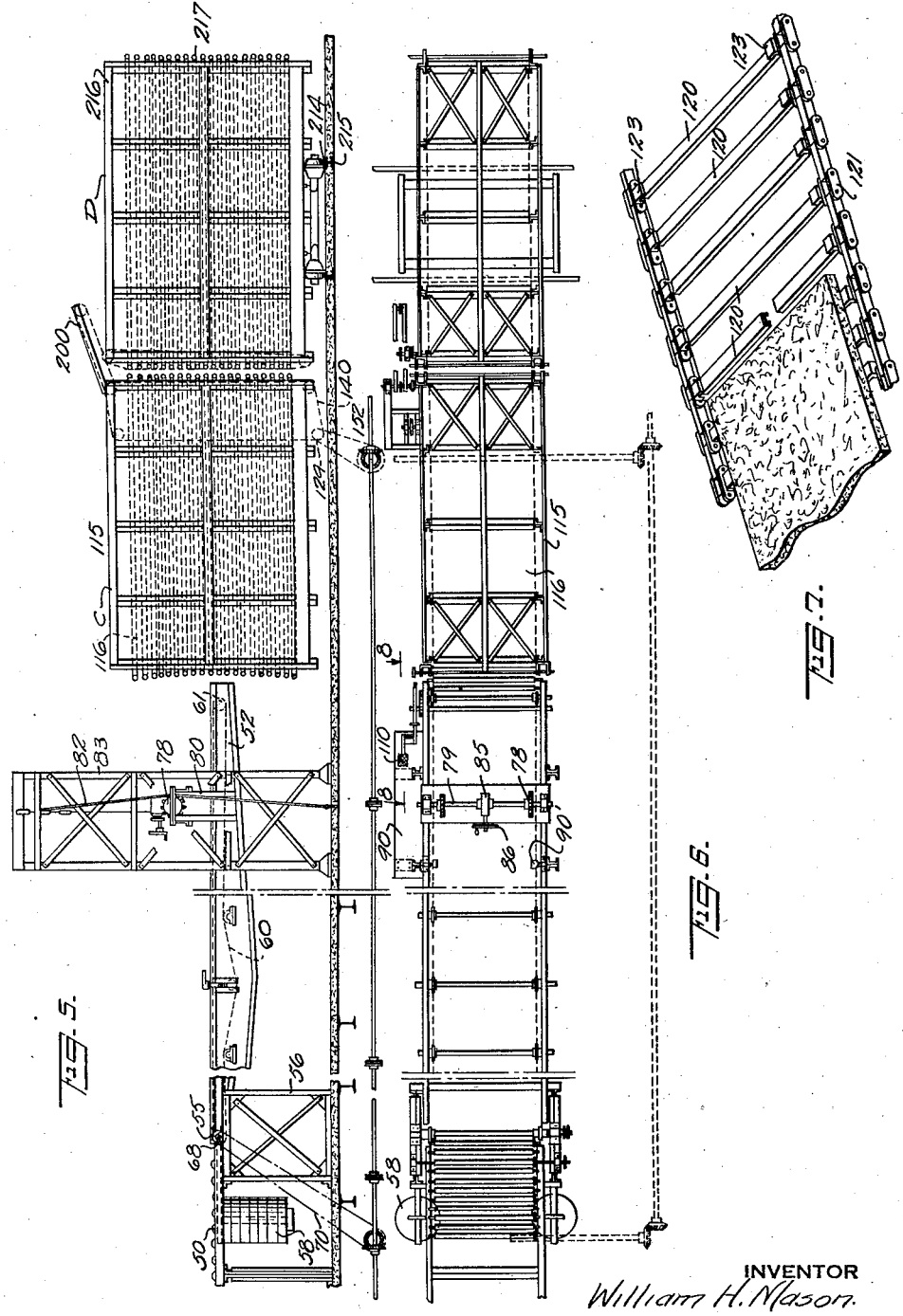
INVENTOR
William H. Mason.
BY
Dyke, Holden & Schaires
ATTORNEYS Aug. 22, 1933. W. H. MASON 1,923,548
ARTICLE HANDLING SYSTEM
Original Filed Nov. 30, 1926 7 Sheets-Sheet 4
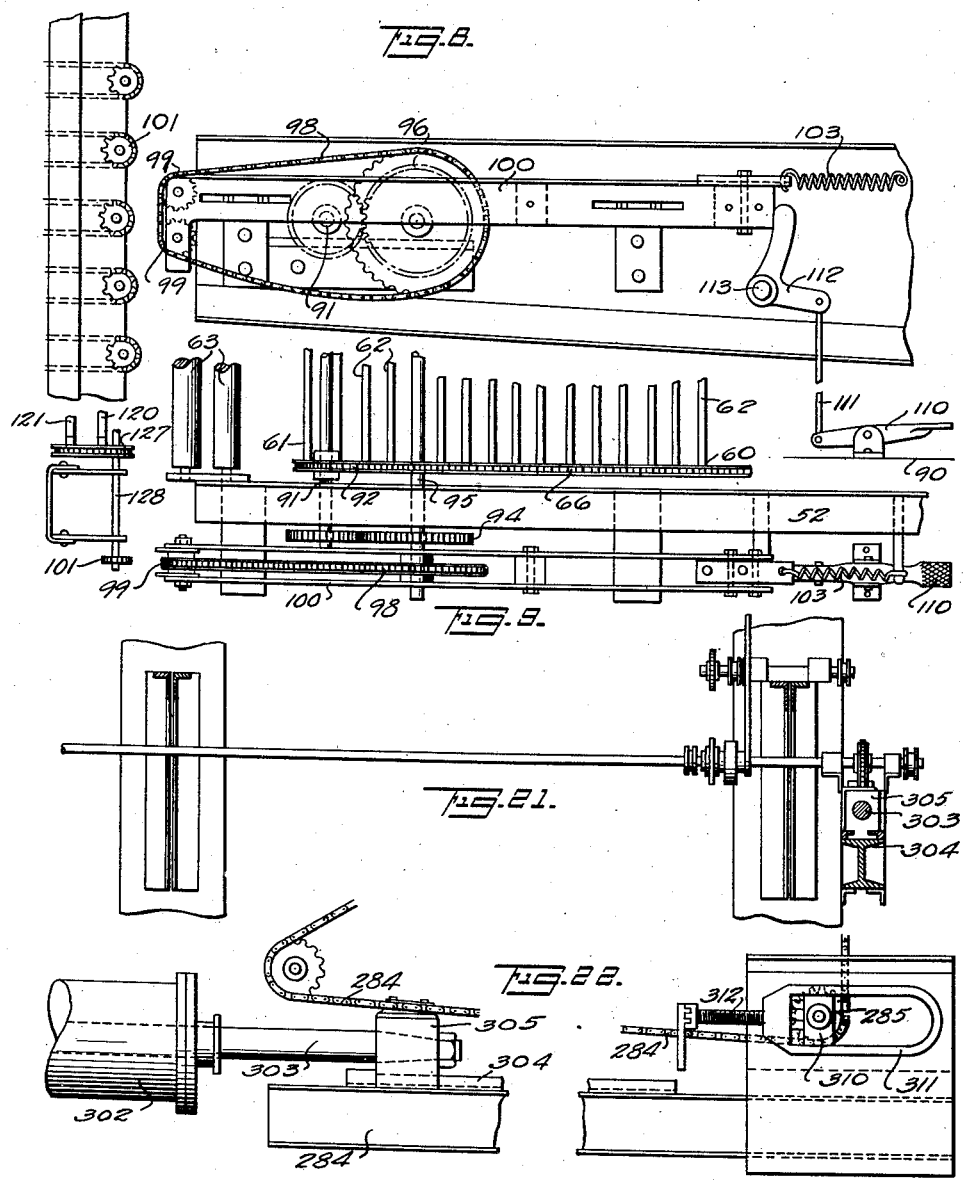
INVENTOR
William H. Mason.
BY
Dyke, Holden + Schaires
ATTORNEYS

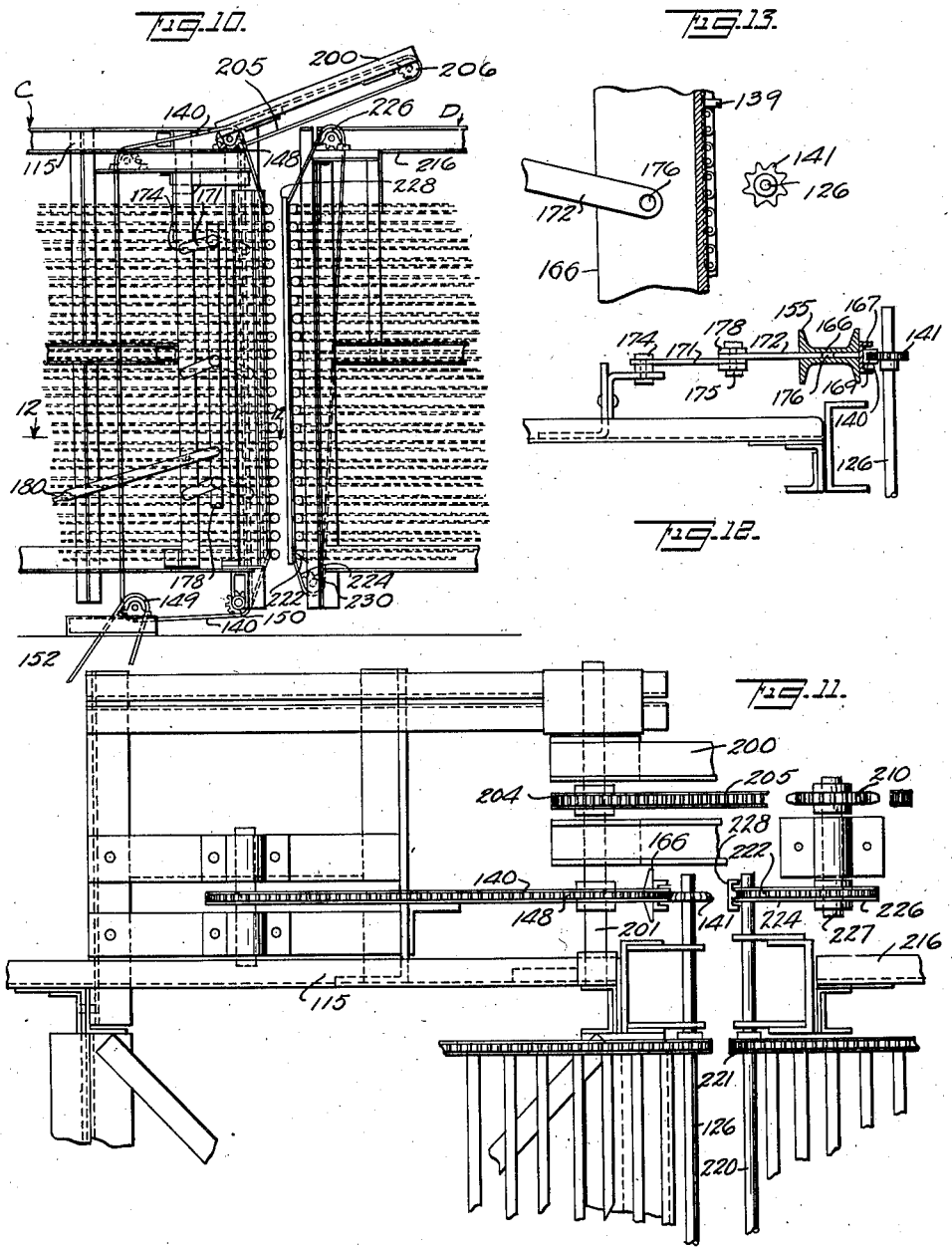

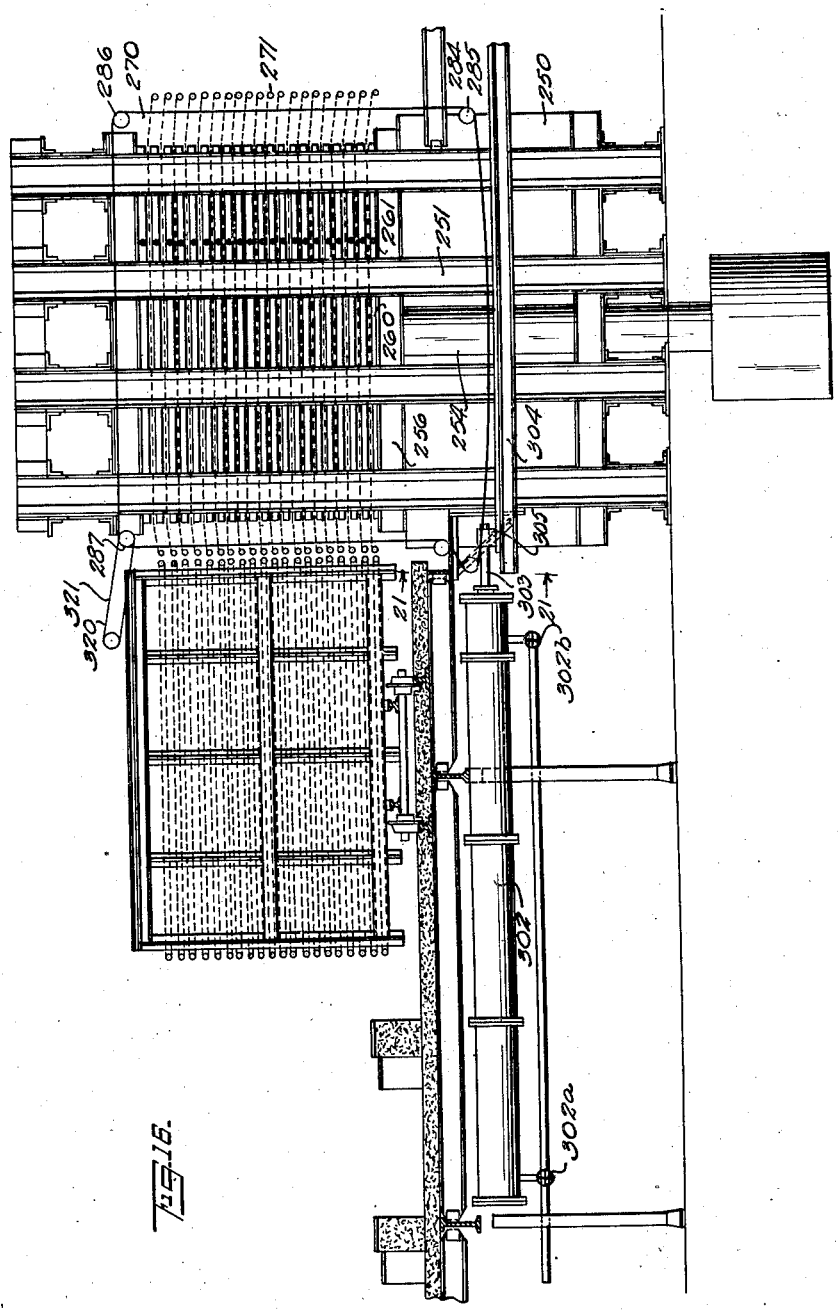

Aug. 22, 1933.   W. H. MASON   1,923,548
ARTICLE HANDLING SYSTEM
Original Filed Nov. 30, 1926   7 Sheets-Sheet 7
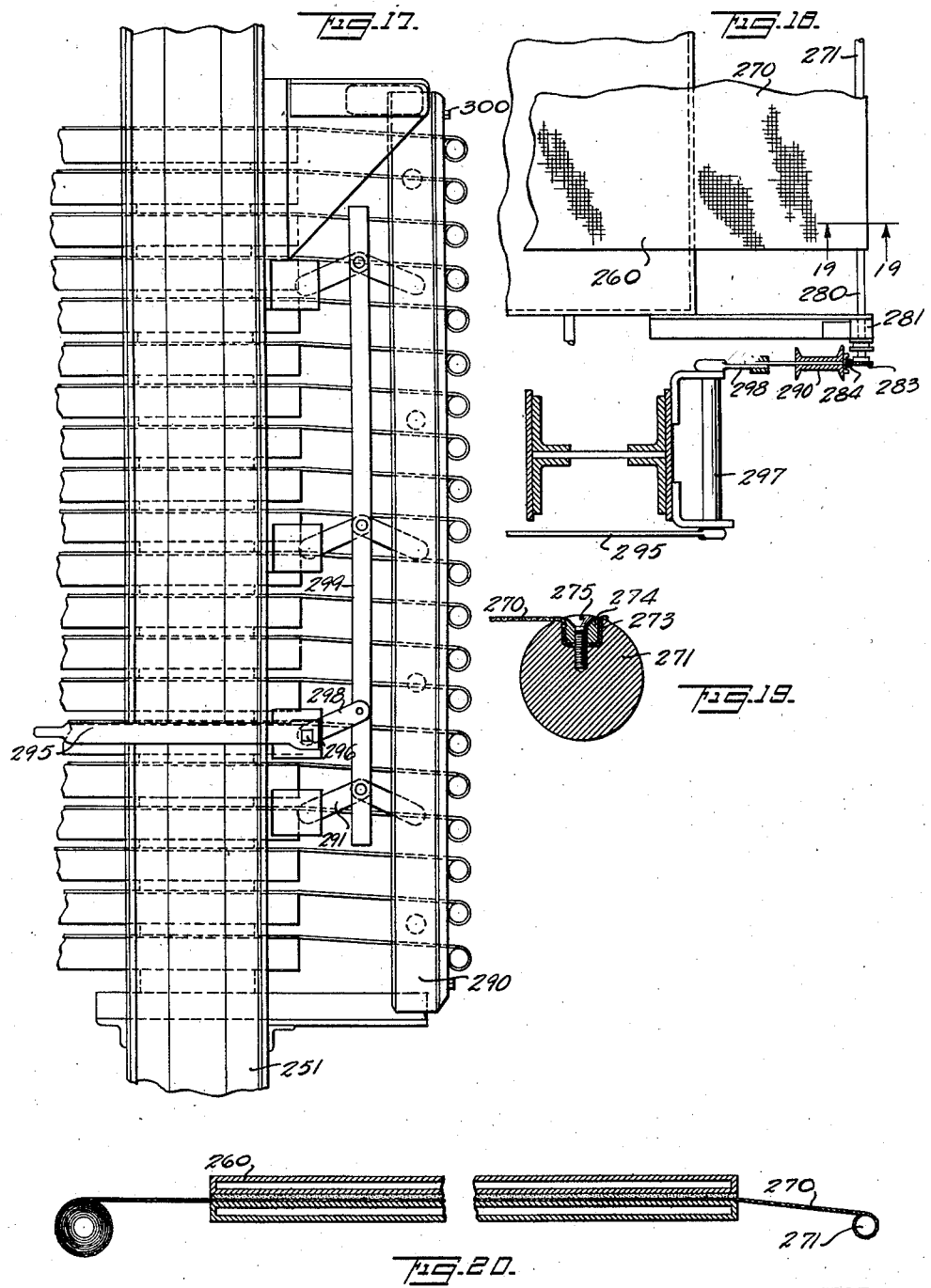
INVENTOR
William H. Mason.
BY
Dyke, Holden & Schaines
ATTORNEYS Patented Aug. 22, 1933

1,923,548

UNITED STATES PATENT OFFICE 1,923,548

ARTICLE HANDLING SYSTEM

William H. Mason, Laurel, Miss., assignor to Masonite Corporation, Laurel, Miss., a Corporation of Delaware Original application November 30, 1926, Serial No. 151,809. Divided and this application May 22, 1929. Serial No. 364,998

12 Claims. (Cl. 198—75)

This application is a division of Patent No. 1,767,539 granted June 24, 1930 upon application Serial No. 151,809, filed November 30, 1926 and relates to a system or apparatus for the handling of articles during their process of manufacture, for example, composition boards, sheets, plates, strips and the like.

One object of my invention is to provide an improved apparatus by which said articles or bodies may be produced efficiently, economically, continuously and in as large quantities as desired.

By the use of my improved system, none of the apparatus used is permitted to remain idle during the manufacturing operations and such apparatus is employed at its maximum efficiency. The manual labor required for the manufacturing operations may be easily performed and but few operators are necessary for the performance of these operations.

The particular apparatus disclosed in the present application, while capable of use with articles of various kinds, is particularly adapted for the handling of soft wet sheets, composed in whole or in part of felted fibrous material such as cellulose, wood fibres, and the like, to form therefrom boards adapted for use as wall boards, artificial lumber or similar construction elements. The process of manufacture includes briefly the formation of sheets of fibrous material from a liquid pulp mass; the partial compression of the sheet and the cutting of it into desired lengths; the transfer of the cut pieces to a hydraulic press where such pieces are finally compressed and dried, the removal from the press and finishing.

In carrying out these operations the raw fibrous material from which the boards are made is divided or disintegrated so as to separate the fibres. I preferably form the divided material by exploding wood in the manner described in my United States Patent 1,578,609 granted March 30, 1926. I mix this material with water to form a liquid pulp mass, which is then run onto the traveling screen of a Fourdrinier machine which forms a mass, in a manner well known in the art, into a continuous sheet with the fibres felted or matted together so that the material when finally dried is self-sustaining. As the sheet moves through the machine, a considerable amount of the water of the pulp mass is removed by draining or suction. The sheet in passing through the machine is squeezed between pressure rollers which serve to compress the material of the sheet increasing its density and strength. After the passing of the pressure roll the partly compressed sheet is moved by a cutting machine which divides the sheet transversely into desired lengths. These cut pieces or partly prepared boards are then loaded into a truck or other vehicle which carries them to a hydraulic press in which they are subjected to pressure and at the same time heated so as to dry them thoroughly. The boards are then reloaded onto the truck, allowed to cool, while on the truck and then finally unloaded for finishing, storage, shipment, etc.

An important feature of my invention relates to the means for the loading and unloading of the truck. The partly formed boards that have been cut from the sheet and which at the time are soft and must be carefully handled are delivered by the Fourdrinier machine one after another in a continuous stream. These boards are delivered onto trucks which carry them to the hydraulic press, one truck being loaded at a time and then being moved away and giving place to an empty truck to be loaded.

In transferring the boards from the Fourdrinier machine to the truck I make use of a means which receives, mechanically or automatically, a number of the boards as they are delivered one by one from the machine, holding these boards until such receiving means is filled and then mechanically and simultaneously discharging all of the boards onto the truck and I also make use of a truck so constructed that it will receive mechanically and simultaneously all of the boards discharged from the receiving means. As the receiving means discharges, it immediately begins to receive other boards from the machine which it continues to do during the time the loaded truck is being moved away and an empty truck being moved into place to receive its load. In this manner I am able to take care of or temporarily store the boards coming from the machine during the time when one truck is moving away with its load and another truck is moving in position to receive a load.

The particular construction of the receiving means and of the truck will be more particularly described hereafter. Briefly each consists of a rack which supports a number of endless conveyors one above the other. The boards as they are delivered from the Fourdrinier machine are received on a specially constructed carrier. This carrier may be tilted, that is, the outer end of the carrier is movable up and down so that it may be brought into position to register with any one of the endless conveyors on the receiving rack. In operation a board travels over the tilting carrier and is received by one of the conveyors on the receiving rack. The operator then shifts the tilting carrier so that the next board will be received by another of the conveyors on the receiving rack. In this manner the receiving rack can be filled with boards.

The truck, when in position to receive its load, is at the side of the receiving rack opposite to the tilting carrier and is in such position that each of its conveyors registers with one of the conveyors on the receiving rack. When the truck is to be loaded suitable mechanism is actuated which serves to move all of the conveyors on both the receiving rack and truck so that all of the boards on the receiving rack are simultaneously shifted to the truck.

As previously stated the boards at the time they leave the Fourdrinier machine are soft and the felting is apt to be broken unless the boards are very carefully handled. The particular means which I employ consisting of the tilting carrier and the conveyors on the receiving rack and the truck permits these boards to be transferred without danger of injury.

Another important feature of my invention relates to the means for the transfer of the partly formed soft boards from the truck to the hydraulic press and for the transfer of the dried boards from the hydraulic press back to the truck. The press is of the steam heated platen type, wherein the platens are arranged one above the other and correspond in number to the number of conveyors on the truck. Between each pair of platens is a carrying means which is adapted to receive a board as it is discharged from the truck. The truck with its load of soft boards is moved to a position in front of the press and suitable mechanism is actuated which moves all of the conveyors on the truck and all of the carrying means on the press with the result that all of the boards are simultaneously discharged from the truck and received by the press. When, after pressing and drying, the truck is to be reloaded from the press, the mechanism just mentioned is actuated in the reverse direction with the result that the pressed and dried boards are discharged from the press onto the truck.

Another feature of my invention relates to the cooling of the dried and pressed boards. The boards are cooled in the truck while resting on the truck carriers. These carriers are so constructed that both sides of the boards will be exposed to the atmosphere and this permits an even cooling of the boards and prevents warping.

Another feature of my invention relates to the general layout of the plant including the relative positioning of the Fourdrinier machine, the receiving rack, the presses, the trucks and the tracks upon which the trucks move. These several devices are so positioned relative to one another as to facilitate the transfer of the boards between them and in general to permit the manufacturing operations to be performed easily, expeditiously, and with a maximum efficiency.

Other features of my invention, including particularly certain novel details of construction of the apparatus employed, will appear from the following description taken in connection with the accompanying drawings wherein Figure 1 is a diagrammatic plan view of the entire plant for producing the finished boards;

Figure 2 is a side elevation of the Fourdrinier machine;

Figure 3 is a perspective view of the board material in the Fourdrinier machine and showing the manner in which this material is progressively flattened and finally cut.

Figure 4 is a perspective view of the finished board;

Fig. 5 is a view similar to Figure 2 showing a continuation of the Fourdrinier machine and showing the tilting or tipple feed, the stationary receiving rack and the truck or movable rack;

Fig. 6 is a plan view of the structure shown in Figure 5;

Fig. 7 is a detailed view of one of the board carriers which are used on the stationary and movable racks;

Fig. 8 is a detail of means for driving the sprockets of the stationary rack from the tilting feed looking in the direction of the arrows in Figure 6;

Fig. 9 is a plan view of the structure shown in Fig. 8;

Fig. 10 is a detail of means for driving all of the movable rack conveyors from the stationary racks so as to transfer the boards from the stationary rack to the movable rack all at once;

Figure 11 is a plan view of the structure shown in Figure 10;

Figure 12 is a section on a line 12—12 of Figure 10;

Figure 13 is an enlarged detail showing a toggle mechanism adapted to move a chain into the path of sprocket wheels on the racks for the purpose of driving all the conveyors of the rack at once;

Fig. 14 and 15 are details of sprocket mounting and conveyor;

Fig. 16 is a side elevation of the movable rack and hydraulic press showing the rack in position in front of the press;

Fig. 17 is an enlarged detail of means for driving all of the carriers of the press so that the press will receive or deliver all of the boards at once;

Figure 18 is the section on the line 18—18 of Figure 17;

Figure 19 is the section on the line 19—19 of Fig. 18;

Fig. 20 is the diagrammatic section of the two press platens, a board and the carrier or supporting screen for the board;

Fig. 21 is the section on the line 21—21 of Fig. 16;

Fig. 22 is a detail showing means for driving the chain which operates the press carriers.

The Fourdrinier machine A shown diagrammatically in Fig. 1 receives liquid pulp at one end (a) and delivers the partly formed soft boards to the tilting carrier or tipple B at the opposite end. The boards delivered by the carrier B are received by the stationary rack C which in turn delivers them to the truck or movable rack D. The truck is then moved along the track E to one of the presses F, suitable turn-tables G being provided for turning the truck at the corners of the track. The press F is charged from the truck, leaving the truck empty and ready to receive a load of pressed and dried boards from one of the other presses. These latter boards when transferred to the truck are permitted to remain on the truck carrier until they are cooled, the truck being shifted to an appropriate place on the track where it remains during the cooling. When the boards are cooled the truck is unloaded at an appropriate place such as J and the boards which can then be handled without danger of injury, may be moved to warehouse, shipped or otherwise disposed of. The truck after final unloading completes the circuit of its travel back to the stationary rack where it is ready to receive a new load of soft boards.

As shown in Fig. 1, I employ five hydraulic presses which take care of the boards from the single Fourdrinier machine A. The number of trucks employed will generally be double the number of presses, that is, ten in the case of the plant shown in Fig. 1.

I will now describe in more detail the particular construction and operation of the various devices illustrated diagrammatically in Figure 1.

The Fourdrinier machine

The raw fibrous material from which the boards are made after being exploded or disintegrated and mixed with water so as to form a liquid pulp is discharged from the spout 30 shown in Figure 2 to the head vat 31 from which it flows over an apron, not shown, onto the endless carrier screen 32 of the Fourdrinier machine. Screen 32 is driven from a couch roll 34. It is supported along its upper length by table rolls 35; at its rear end by the breast roll 36 and along its lower length by wire rolls 38. 40 represents one of the usual deckle straps which engage the wire screen 32 along its sides and prevent the liquid pulp from flowing off the edges of the screen.

As the pulp mass travels forward on the moving screen a considerable amount of water contained in the mass is drained off through the openings in the screen and more of this water is removed from the mass by suction devices indicated conventionally at 41. The customary means may be provided for giving the screen as it moves forward a sidewise motion which has the effect of causing the fibres of the mass to become felted or matted together. Rolls 42 and 43 are provided for laying down the fibres and pressing the pulp before it leaves the wire screen. After passing the last of the rolls 44 the pulp in the form of a felted sheet, passes by a cutting machine 46 which divides the sheet transversely into lengths corresponding to the lengths of the finished boards. The boards as they come from the cutting machine while still soft and wet are sufficiently strong so that they may be transferred to the press if very carefully handled. By employing a plurality of suction boxes 41, I am able to extract most of the water from the boards and these boxes cooperating with the rolls 42 and 43 serve to dry and press the pulp sufficiently so that the boards cut from the pulp sheet may be transferred to the press by a means which will be described in detail hereafter.

Figure 3 shows the pulp material in its various stages of passing through the Fourdrinier machine. At the left hand of Figure 3 it is shown as a loose mass of unfelted fibres and at the right hand, as a cut board, the material of which has been felted and considerably compressed. The detail construction of the several parts of Fourdrinier above mentioned is well known and for this reason I have illustrated such parts in a conventional manner.

The tipple

The boards delivered from the cutter 46 pass over a series of driven table rolls 50 to the tipple or tilting carrier B which is illustrated at the left hand of Figures 5 and 6. The function of this carrier as previously explained is to move the boards from the cutting machine to one or another of the conveyors of the stationary rack C. The tipple B consists of a frame 52 which is pivotally mounted at 55 on a supporting structure 56 and is suitably counterbalanced at 58 so that the tipple can be easily swung from one position to another. The frame 52 carries an endless carrier 60 which extends from the rear end of the tipple to the point 61, a short distance to the rear of the forward end of the tipple. This carrier consists of a series of slats or boards 62 supported by chains 66 as shown in Fig. 9. Chains 66 are driven from sprockets 68 at the rear of the tipple. Sprockets 68 are in turn driven by a chain 70 from the main drive shaft 71 of the Fourdrinier machine. The boards after leaving the carrier 60 and before passing on to the stationary rack pass over a series of gravity rolls 63 supported at the forward end of the tipple. For a purpose which will be more fully explained hereafter the connection between the main drive shaft of the Fourdrinier machine and the carrier 60 and the tipple is such that the carrier 60 is driven at a greater speed than the table rolls 50.

In order to move the outer end of the tipple B up or down so as to cause it to deliver boards to anyone of the stationary rack conveyors, I provide the tipple with a pair of sprocket wheels 78 mounted on a shaft 79 which is journaled in supporting members 80 that are secured and extend upwardly from the side of the tipple frame 52.

Engaging each of the sprocket wheels 78 is a chain 82 which is secured at its lower end to the floor beneath the tipple and its upper end to the top of a stationary frame 83, above the tipple carrier. The tipple is tilted from one position to another by turning the sprockets 78 and for this purpose I provide the shaft 79 with a worm drive 85 which may be actuated by a hand wheel 86 within reach of an operator who stands on a platform 90 carried by and movable with the tipple frame 52. When the tipple is moved to a position in which its carrier registers with one of the conveyors of the stationary rack, a spring latch moves into one of a series of recesses formed in the side of the stationary frame 83 and in this manner insures the proper positioning of the tipple relative to the conveyor on the stationary rack.

The conveyors on the stationary rack are normally idle and operate only when connected by the operator to a driving means. When the tipple is about to deliver a board to one of the conveyors of the stationary rack the operator connects an operating means located on the tipple with this particular conveyor on the stationary rack so as to actuate the conveyor to receive the board. This operating means comprises a shaft 91 driven from the chain 66 of the tipple carrier 60 through sprocket wheel 92. (See Fig. 9). Shaft 91 carries at its outer end a gear 93 which meshes with the gear 94 fixed to a counter shaft 95. Shaft 95 carries at its outer end a sprocket wheel 96 which serves to move a sprocket chain 98 that passes over the sprocket wheel 96 and over two toothed guide rolls 99 mounted at the extreme front end of the tipple on a frame 100. Frame 100 is slidable forward and backward on the tipple frame 52. When frame 100 is moved to extreme forward position, the chain between the toothed rolls 99 engages one of a number of toothed wheels 101 on the stationary or receiving rack C; the particular toothed wheel so engaged serving to actuate that one of the conveyors on the receiving rack which is to receive the board from the tipple. As the chain 98 is being continuously driven from the tipple carrier, as soon as the chain is brought into engagement with the toothed wheel 101, the wheel rotates and drives the proper conveyor to receive the board from the tipple.

The frame 100 which carries the rolls 99, is normally held in its rear or retracted position by a spring 103, one end of which is secured to the slidable frame 100 and the other end of which is secured to the frame 52 of the tipple. For the purpose of advancing the frame 100, I provide a pedal 110 mounted on the tipple platform 90 within convenient reach of the operator. Pedal 110 is connected by a link 111 to a bell crank lever 112 pivoted at 113 to the tipple frame 52. The upper end of the bell crank lever 112 engages the rear end of the slidable frame 100 and when the pedal 110 is pressed, moves the frame 100 forward. Figures 8 and 9 show the frame 100 in its retracted position, the operating chain 98 sagging between the sprocket 96 and the rolls 99. As the rolls 99 are moved forward the slack in the chain 98 is taken up and the chain permits the rolls 99 to advance.

The stationary rack

Figures 5 and 6 show the stationary rack C located between the movable rack D and the tipple B. The stationary rack consists of a fixed frame work 115 which supports a number of endless conveyors 116. Figure 5 shows twenty stationary rack conveyors located one above the other. The detail construction of these conveyors is shown in Figs. 7, 14 and 15. Each consists of a series of transverse supporting members or bars 120 extending between and carried by two endless chains 121. The bars 120 are secured to the chain links by angle brackets 123. Each of the chains is carried by a front sprocket wheel 125 mounted on a transverse shaft 126 journaled in the framework 115 and by a similar rear sprocket wheel 127 mounted on a shaft 128 likewise journaled in the framework 115. For the purpose of supporting the conveyor chains along their lengths I provide angle members 130 secured along the side of the framework 115. Each of these members 130 is formed with an upward extending portion 131 on the top of which the conveyor chain rides. Each of the upwardly extending portions 131 overlaps vertically the member 130 above. The chain is formed of opposite side links 134 and transverse members connecting the links, each member comprising a bolt 136 and a sleeve 137 loosely mounted on the bolt. The portion 131 engages the bottoms of the sleeves and as the chain moves the sleeves roll on the top of the portion 131. The connecting side links 134 of the chain extend a short distance down on opposite sides of the portion 131 of the supporting member 130 as shown in Figure 14 and it will be seen that by this construction the chain is not only supported along its length but is also held against lateral displacement by engagement of the chain links with the sides of the portion 131. The conveyors 116 as described are not only very compact but are so constructed that they will support the boards evenly over their entire area and will move the boards without injuring them. It may be remarked at this time that the conveyors on the movable rack are of substantially the same construction as the conveyors on the stationary rack which have just been described.

When one of the conveyors on the stationary rack is to receive a board from the tipple B, the operator presses the foot lever 110 on the platform 90 and causes the moving chain 98 to engage the toothed wheel 101 as previously stated. This wheel is mounted on the shaft 128, above described and when shaft 128 is rotated it serves to actuate the particular conveyor selected.

When the boards are unloaded from the stationary rack to the truck or movable rack, all of the conveyors on the stationary rack and on the movable rack are operated at once. The operation of all the conveyors on the stationary rack is effected by engagement of a moving endless chain 140 with toothed wheels 141 mounted on shafts 126, which shafts carry the conveyor sprocket chains 125. The chain 140 passes over two upper sprockets 147 and 148 at the top of the frame 115 and under two sprockets 149 and 150 at the bottom of the frame 115 (see Fig. 10). Sprocket 149 is driven from the main drive 71 of the Fourdrinier machine through a chain 152. The chain 140 extends up the front of the stationary rack, back of the toothed wheels 141, where it is engaged by a movable guide 155. Figures 12 and 13 show the chain 140 and guide 155. The guide 155 comprises a bar 166 which extends from the top to bottom of the stationary rack. Secured along the front of the bar 166 is a channel member 167, the sides of which project forwardly toward the toothed wheel 141. The bottom of the channel of the member 167 is formed with a forwardly projecting rib 169 which engages the chain between opposite side links of the chain and serves to prevent the chain from moving laterally. The chain is held against the guide by clips located at the top and bottom of the guide.

The guide 155 is employed to move the chain 140 forward into engagement with the toothed wheels 141 when it is desired to move all of the conveyors of the stationary rack simultaneously. For this purpose the guide 155 is mounted on the framework 115 of the stationary rack so that it can be moved forward and backward by means of toggles 170 each formed of links 171 and 172; the link 171 being pivoted at 174 to the framework 115 and at 175 to the link 172 and the link 172 being pivoted at 176 to the guide 155. A bar 178 connects all of the pivotal points 175 of the toggles. To move the chain 140 into engagement with the toothed wheels 141, the toggles 170 are straightened by moving the bar 178 downwardly. The bar is moved by a pivoted handle 180 (see Figure 10) conveniently located at the side of the rack.

While I have disclosed the means for operating all of the stationary rack conveyors as consisting of a single chain adapted to be moved into engagement with and operate a toothed wheel keyed at one end of each of the shafts 126, it will be understood that I may if desired employ two chains located at opposite sides of the stationary rack and provide each of the shafts 126 with two toothed wheels at opposite ends for cooperation with the two chains, In this case the single handle 180 will serve to move both of the chains into engagement with their respective toothed wheels.

When the conveyors on the stationary rack are actuated as just described, to cause the boards to be delivered simultaneously on to the movble rack, the conveyors on the movable rack are also actuated simultaneously to receive the boards. The conveyors on the movable rack are operated from the stationary rack by a means shown in detail in Figure 11 wherein 200 represents a swinging frame which is loosely mounted on a shaft 201 and which extends over the top of the rear end of the movable rack when the movable rack is in its loading position. Frame 200 is adapted to occupy two positions, a raised or inoperative position and a lowered or operative position. The frame 200 is shown in its raised position in Figure 10 and in its lowered position in Figure 5.

Shaft 201 on which the frame 200 swings is journaled in ball bearings in the framework 115 of the stationary rack and has keyed thereto the sprocket wheel 148 which is driven by means of the chain 140 as previously stated. Also keyed to the shaft 201 is a second sprocket wheel 204 over which passes an endless chain 205. Chain 205 extends forward of the sprocket 204 and around a supporting sprocket 206 journaled in ball bearings in the forward end of swinging frame 200. The chain 205, due to its connection with the driving chain through the sprocket 204, shaft 201 and sprocket 148, is constantly moving and when it is desired to operate the conveyors on the movable rack, the frame 200 is swung from its upper to lower position, which causes the chain 205 to engage a sprocket wheel 210 and through this sprocket wheel to operate all of the conveyors on the movable rack. Any suitable means may be employed for swinging the frame 200 from one of its positions to the other. In practice I prefer to swing the frame 200 by the same means which moves the chain 140 on the stationary rack into engagement with the toothed wheels 141, namely the handle 180. Handle 180 may be connected in any suitable manner with the swinging frame 200 so that when the handle is moved to straighten the toggles 170 and cause engagement of the chain 140 with the toothed wheels 141, the frame 200 is swung downward and chain 205 engages sprocket 210. In this manner all of the conveyors of the stationary rack are operated to discharge the boards and all of the conveyors of the movable rack are simultaneously operated to receive the boards discharged.

*The movable rack*

The movable rack D is supported on wheels 214 mounted to run on rails 215 of the track E. It comprises a framework 216 which carries the endless conveyors 217, twenty in number. As these conveyors are similar in construction and mounting to the conveyors of the stationary rack a detailed description of them need not be given. The rear shafts of the movable rack conveyors on which the conveyor chain sprockets 221 are mounted, have keyed thereto, at their outer ends driving wheels, 222, which are engaged by an endless operating chain 224. The chain 224 is kept constantly in engagement with the wheels 222 by a fixed guide 228 similar in construction to the guide 155 on the stationary rack. Chain 224 is operated from a sprocket 226 shown in Figure 11, sprocket 226 is keyed to a shaft 227 which is journaled in ball bearings mounted on the movable rack framework 216. The sprocket 210 which drives all of the movable rack conveyors is keyed to the outer end of a shaft 227. Chain 224 at its lower end passes under a sprocket 230 mounted in the lower part of frame 216.

*Transfer of boards from the Fourdrinier machine to the movable rack*

As previously stated the transfer of the boards from the Fourdrinier machine to the movable rack involves the loading with boards, of the conveyors on the stationary rack and the simultaneous discharge of all these boards to the movable rack. Let it be assumed that the stationary rack is loaded with boards and the operator has just moved the handle 180 to cause all of the conveyors of the stationary rack and of the movable rack to be operated so that these boards will be transferred from the stationary to the movable rack. At this time the tipple B which is under control of an operator standing on the platform 90, will generally be in its uppermost or lowermost position, its front end registering with either the top or bottom conveyor of the stationary rack. As the conveyors of the stationary rack are operated to discharge their load, a board moving along the tipple carrier will be transferred from the tipple to the particular stationary rack conveyor with which the tipple is in registration. The speed of the stationary rack conveyor is the same as that of the tipple conveyor and as one board leaves this particular stationary rack conveyor its place is taken by another board from the tipple. This operation therefore loads the movable rack and places a single board on one of the stationary rack conveyors. The handle 180 is then moved to stop all of the conveyors on the stationary and movable racks. The operator on the platform 90 then tilts the tipple B by turning the crank 86 until its carrier registers with the next stationary rack conveyor and its operator then presses the pedal 110 which serves to move the chain 98 forward engaging one of the toothed rolls 101 with the result that the next stationary rack conveyor is operated to receive the next board from the tipple. In this manner the operator on platform 90 continues to load the stationary rack conveyors in succession until they are all filled. In the meantime the loaded truck has moved away to the hydraulic press and an empty truck has taken its place in front of the stationary rack. The handle 180 is then again moved, and the stationary rack discharges into the movable rack which has in the meantime been brought into loading position.

The boards as they are fed over the table rolls 50 toward the tipple are very close together. As some time is consumed in moving the tipple from a position to feed to one stationary rack conveyor to a position to feed to the next stationary rack conveyor, provision is made for separating the boards as they move forward so as to give the operator time after one board has been fed to a stationary rack conveyor to move the tipple to a new position before the next board reaches the end of the tipple. The separation of the boards is accomplished by driving the tipple carrier 60 at a greater speed than the table rolls 50. In this manner each board as it moves on to the tipple carrier 60 is accelerated and moves some distance ahead of the board behind. It will, of course, be understood that the speed of the tipple carrier and of the stationary and movable rack conveyors are the same.

*The hydraulic press*

The hydraulic press is shown in side elevation in Fig. 16 and comprises a frame 250 formed in part of columns 251 consisting of heavy I-beams. The press has a plunger 254 which extends downwardly into a hydraulic cylinder, located beneath the base of the press. The plunger 254 is raised by admitting water to the hydraulic cylinder and is lowered by releasing water from the cylinder in a manner well known in the art. Plunger 254 carries the usual plunger head 256. Mounted inside the press frame are movable platens 260 corresponding in number with the number of conveyors on the movable rack. The platens are preferably formed of steel and partly hollow and suitable means is provided, as indicated at 261, for admitting steam to the interior of the platen. The platens, when the press is open, are seated on the usual stepped supports which serve to support the platens in spaced relation to one another so as to permit a board to be fed into the space between each pair of platens. When the plunger 254 is raised the platens are raised off their seats and closed together in the usual manner in this type of press.

Mounted on each of the platens and movable with the platen as it rises and falls, is a carrier consisting of a wire screen 270 which is secured at one end to a roll 271 at the back of the press and extends forward on the upper face of the platen and is secured at its opposite end to a roll 272 similar to the roll 271. The screen 270 is considerably longer than the distance between the rolls 271 and 272 and the excess length of the screen is wound on one or the other of the rolls. The manner of attaching the ends of the carrier screens to the rolls is shown in Fig. 19. The roll is formed with a longitudinal slot or groove 273 into which fits a bar 274 which is adapted to be secured in the groove by screws 275, the end of the screen being clamped between the bar 274 and the walls of the groove 273.

A shaft 280 is secured to the end of each roll 271 and each shaft 280 is rotatively mounted near each end in a bearing 281 supported from a corner of the platen 260 as shown in Figure 18. Each of the shafts 280 at one side of the press, has keyed thereto at its outer end, a toothed wheel 283. The wheels 283 are adapted to be rotated by an endless chain 284 which moves alternately into an engagement with all of the wheels 283, at the back of the press and into engagement with all of the wheels 283 at the front of the press, thereby alternately rotating all of the rolls 271 or all of the rolls 272. The endless chain 284 extends from the top to the bottom of the press and from the front to the back of the press as shown in Fig. 16. This chain is supported at the back of the press by a bottom sprocket 285 and a stop sprocket 286 and at the front of the press by a top sprocket 287 and bottom sprockets 288 and 289. Sprocket 285 is mounted in a bearing 310 which is slidable in a guide 311 and may be adjusted to different positions along the guide by means of a screw 312 as shown in Figure 22; the adjustable sprocket 285 forming a tensioning means for the chain 284. At the back of the press the chain 284 lies in front of the back toothed wheels 283 being normally out of engagement with these wheels. 290 represents a guide which is similar in construction to the guide 155 for the endless actuating chain 140 of the stationary rack, previously described. Guide 290 is adapted to move the chain 284 into engagement with the toothed wheels 283 at the rear of the press and for this purpose the guide 290 is slidably mounted on the press frame and is adapted to be moved forward and backward by a series of toggles 291, one end of each of which is connected to the guide 290 and the other end to the press frame.

For the purpose of moving the toggles I provide a handle 295 formed with a square opening 296 adapted to fit over the square end of the shaft 297 rotatively mounted on one of the press columns 251. The inner end of shaft 297 carries an arm 298 which is secured to the vertical bar 299 that connects the center to all of the toggles 291. When the handle 295 is turned in one direction the chain 284 is moved backward into engagement with rear wheels 283 and when the handle 285 is moved in the opposite direction the chain is moved forward away from the rear wheels 283. The guide 290 is provided at its top and bottom with suitable clips 300 which extend around the chain and serve to hold the chain 284 in contact with the guide 290 so that when the guide is moved forward away from the wheels 283 the clips 300 will serve to move the chain backward with the guide. A similar guide to the one used at the rear of the press and shown in Figures 17 and 18 is used at the front of the press for causing engagement and disengagement of the chain 284 with the front wheels 283.

For the purpose of moving the chain 284 I provide a hydraulic cylinder 302 located beneath the bed of the track E. The cylinder 302 is provided with a piston rod 303 the outer end of which carries a crosshead 305 which is supported and adapted to move back and forth on a guide 304 as shown in Figures 16, 21, and 22. The top of the crosshead 305 is connected to the chain 284 and serves to move the chain 284 in one direction or the other. Cylinder 302 is provided with suitable controlling means which comprises valves 302a and 302b for admitting of fluid to the cylinder and releasing fluid from the cylinder and by the operation of these valves the piston 303 may be caused to move forward and backward as desired and its speed of movement can be nicely controlled.

At 320 (Fig. 16) is shown, conventionally, a swinging frame which is similar in construction to the swinging frame 200 of the stationary rack. Frame 320 which carries an endless chain 321 driven from the press chain 284 is mounted at the top of the hydraulic press and is adapted to be swung downward so that cahin 321 engages toothed wheel 210 of the movable rack and serves to actuate the movable rack conveyors to deliver boards to the press carriers when the press is being loaded and to receive boards from the press carriers when the press is being unloaded.

In operation the movable rack with its load of boards will be moved into position shown in Figure 16 in front of the press and with the end which has the operating chain 224 adjacent the press. At this time the press is open, the platens are spaced from one another as shown in Figure 17 and the carrier screens of the press which extend from the rolls 271 at the back of the press across the platens 260 to the rolls 272 at the front of the press will be unwound from the rolls 271 and wound on the rolls 272. Piston 303 and crosshead 305 will be in the position shown in Figs. 16 and 22. When the movable rack is in position to deliver its load to the press, the frame 320 will be swung down so that the chain 321 will engage the sprocket wheel 210 of the movable rack. The handle 295 will be moved so as to cause the chain 284 to engage the toothed wheels 283 at the back of the press. Water will be then admitted to the hydraulic cylinder 302 with the result that the piston 303 and crosshead 305 will be moved toward the rear of the press along the guide 304, thereby moving the chain 284. Chain 284 because of this engagement with toothed wheels 283 will cause these wheels to rotate in a clockwise direction as viewed in Fig. 16 and wind the carrier screens 270 on the rolls 271 unwinding these screens from the rolls 272. At the same time the chain 321 on the swinging frame 320 will be rotating the toothed wheel 210 on the movable rack and causing the chain 224 of the movable rack to move in such a manner as to cause the movable rack conveyors to deliver the boards onto the press carriers which receive them and carry them to position between the platens ready for pressing. Water will then be admitted to the main press cylinder causing the press piston 254 to be raised which will close up the platens and cause each of the boards to be compressed between the bottom face of one platen and the carrier screen which lies on the platen beneath, as shown in Fig. 20. Steam will be admitted to the interior of the platen and the boards will remain pressed until thoroughly dried. When desired, steel stop blocks may be inserted between the platens to limit the degree of compression of the boards and to secure a product of uniform gauge. The screen 270 assists in the drying operation in that it permits the vaporized water from the board to escape to the outside along the wires of the screen. When dried, the plunger 254 of the press is lowered and the platens resume their spaced position shown in Fig. 16, with the press boards supported on the carrier screens 270. In order to unload the press onto the truck the piston 303 is moved in the opposite direction, lever 295 having been moved in the meantime to release the chain 284 from the back wheels 283 and a similar lever at the front of the machine moved so as to cause the engagement in this chain with the front wheels 283. The movement of the piston rod 303 in the opposite direction results in winding the carrier screens onto the rolls 272 at the front of the press and unwinding these screens from the rolls 271 at the back of the press. This reverse movement of the piston 303 will also cause the chain 321 of the swinging frame 320 to be moved in the direction opposite to that in which it was moved during the unloading operation. This results in the conveyors of the movable rack being moved in such direction as to receive the boards from the press. When the movable rack is loaded with the pressed boards it is moved away from the press to give place to another rack loaded with wet boards and the pressed boards are allowed to remain on the first rack until they are cooled.

As previously stated I preferably employ four hydraulic presses to take care of the product of one Fourdrinier machine. I may, if desired, actuate the carriers of all the presses from one hydraulic cylinder 302. In Fig. 1 I have shown a shaft 330 extended along the front of all of the five presses. This shaft is preferably formed of sections connected by friction clutches indicated at 331 in Fig. 1. The first section 332 of the shaft 330 carries the sprocket 288 shown in Fig. 16. Rotation of the sprocket 288 by the chain 284 serves to rotate section 332 of the shaft 330 and will rotate all the other sections of the shaft 330 which are operatively connected to the section 332 by friction clutches 331.

I claim:

1. The combination of a stationary rack, a travelling rack adapted to occupy a position at one end of the stationary rack, each of said racks having a series of superposed conveyors so arranged and adapted to be actuated in such a manner that, when said movable rack is in said position at the end of said stationary rack, a load on each of the stationary rack conveyors may be discharged to and received by a corresponding travelling rack conveyor, means for simultaneously actuating said stationary rack conveyors and a driving connection between the two racks for actuating said movable rack conveyors in unison with said stationary rack conveyors.

2. A stationary rack, a movable rack, each having a series of endless conveyors one above the other, said movable rack being adapted to occupy a position in which each of its conveyors registers with one of the stationary rack conveyors and means for moving all of said conveyors so that said stationary rack conveyors discharge on to said movable rack conveyors, said means including a driving connection for said stationary rack conveyors, a shaft journaled in said stationary rack and driven by said driving connection, a frame loosely mounted on said shaft and adapted to be swung toward said movable rack, a sprocket secured to said shaft adjacent said frame, a chain guide at the outer end of said frame, an endless chain engaging said sprocket and supported at its outer end on said guide, a second sprocket on said movable rack in position to be engaged by said chain when said frame is swung toward said movable rack, and driving connections between said second named sprocket and all of the movable rack conveyors.

3. In a plant wherein material is transferred in quantities from one place to another, a travelling rack movable in a horizontal direction between said places, said rack comprising a series of superposed conveyors adapted to be actuated to receive or to discharge a load, means on said rack for simultaneously actuating all of said conveyors and means located at each of said places for engaging and driving said conveyor actuating means.

4. The combination of a movable rack having a series of endless conveyors, a toothed wheel for actuating said conveyors mounted on said rack and means for driving said toothed wheel consisting of a shaft rotatably mounted on a stationary support, a sprocket wheel mounted on said shaft, an endless chain engaging said wheel, and means for moving a portion of said chain remote from said sprocket wheel into and out of engagement with said toothed wheel.

5. The combination of a movable rack having a series of endless conveyors, a toothed wheel for actuating said conveyors mounted on said rack and means for driving said toothed wheel consisting of a shaft rotatably mounted on a stationary support, a sprocket wheel mounted on said shaft, a frame loosely mounted on said shaft adjacent said sprocket wheel, a guide on said frame remote from said wheel, a chain engaging said sprocket wheel and guide and means for swinging said frame about said shaft so that said chain engages and drives said toothed wheel.

6. Means for converting a continuous stream of articles into superposed groups for transportation comprising: a stationary rack having therein a set of superposed endless belt stacking conveyors, means for directing the stream of articles to successive ones of said conveyors, a first means to drive each stocking conveyor singly as it is being charged without driving any other conveyor, a traveling rack having a corresponding set of endless belt conveyors therein, said traveling rack being so constructed as to be readily positionable adjacent the stationary rack and at its fixed level, and a second means operable by a single control to actuate the conveyors on both racks simultaneously and in the same direction and at the same speed, whereby transfer of a batch to the traveling rack is effected without interrupting the continuous feed.

7. An article handling system comprising a track laid in an endless path, a collecting and loading station adjacent said path comprising a series of superposed traveling endless conveyors at right angles to said track, a receiving station adjacent said track, said receiving station having a similar series of conveyors also at right angles to the track, and a traveling frame on the track having a similar series of conveyors, a drive means at the loading station arranged to drive the conveyors of the loading station and of the traveling rack simultaneously to load the rack, and a drive means at the receiving station arranged to drive the conveyors of the traveling rack and the receiving station simultaneously to unload the rack.

8. A stationary rack having a plurality of conveyors thereon located one above the other, means for feeding material selectively to any single one of said conveyors, means for moving the surface of that conveyor along to receive the article fed while the other conveyors remain stationary, a traveling rack arranged to be located adjacent the discharge end of the stationary rack, superposed conveyors on the traveling rack corresponding to the conveyors on the stationary rack, and a common means to advance the supporting surfaces of both sets of conveyors simultaneously to effect the transfer of the entire load at once from the stationary to the traveling rack.

9. A device for taking groups of sheets in spaced superposed relation from a continuous stream of sheets comprising a stationary rack having therein a plurality of superposed conveyors, means to direct the sheets of the stream one onto each conveyor, means independent of the hereinafter mentioned traveling rack to actuate each conveyor alone, as the sheet is fed onto it, to the point where the complete sheet is deposited on that conveyor, control means enabling the operator to discontinue the actuation of the conveyor at that point, a traveling rack arranged to come to a position adjacent said stationary rack, corresponding conveyors on said traveling rack, and means to actuate all of both groups of conveyors simultaneously to transfer the sheets all together from the stationary rack to the traveling rack.

10. A sheet handling apparatus comprising a carrier bringing a continuous stream of sheets one to each of a series of superposed traveling conveyors on a stationary rack, means for driving each of said superposed conveyors while a sheet is being fed onto it while the others of the series remain at rest, a second series of superposed traveling conveyors on a traveling rack arranged to correspond with the conveyors on the stationary rack, and means having a single common control to drive all of both sets of conveyors simultaneously to transfer all the sheets simultaneously from the stationary rack to the traveling rack for transportation.

11. A stationary rack positioned at the end of a single-level continuous feed stream and having therein spaced superposed endless conveyors, means to direct said stream to any selected one of said conveyors, a means independent of the hereinafter-mentioned traveling rack for driving any selected one of said conveyors for feeding in, without driving any of the others, a means for driving all of said conveyors simultaneously in the same direction as before for discharging, a traveling rack mounted on anti-friction supporting means and having corresponding spaced superposed endless conveyors, arranged to move into a position adjacent to said stationary rack with the upper surfaces of the conveyors of the traveling rack at the same levels as the upper surfaces of the conveyors of the stationary rack, and means to drive all the conveyors of both racks in unison to transfer the accumulated load on the conveyors of the stationary rack onto the conveyors of the traveling rack.

12. A stationary rack having a plurality of traveling-bed stacking conveyors thereon located one above the other, feeding means at one end of said rack for delivering a load to any one of said conveyors selectively, drive means at the feeding-in end adapted to drive singly whichever one of said conveyors the feeding means is positioned opposite, a traveling rack positionable at the other end of said stationary rack and having corresponding traveling-bed receiving conveyors, and a second drive means, having a control with an inoperative position, and an operative position in which said second drive means drives all the stacking conveyors and all the receiving conveyors in unison whereby the load is transferred from the stationary to the traveling rack.

WILLIAM H. MASON.